United States Patent [19]
Abe

[11] Patent Number: 5,473,591
[45] Date of Patent: Dec. 5, 1995

[54] METHOD FOR RECORDING AND REPRODUCING DATA ON RECORDING MEDIUMS

[75] Inventor: Michiharu Abe, Yokohama, Japan

[73] Assignee: Ricoh Company, Ltd., Tokyo, Japan

[21] Appl. No.: 191,322

[22] Filed: Feb. 2, 1994

[30] Foreign Application Priority Data

Feb. 5, 1993 [JP] Japan ................. 5-041913

[51] Int. Cl.⁶ .................. H04N 5/76; G11B 5/09
[52] U.S. Cl. .................. 369/59; 360/40; 360/46
[58] Field of Search ............... 369/59; 360/41, 360/40, 46

[56] References Cited

U.S. PATENT DOCUMENTS

| | | | |
|---|---|---|---|
| 5,210,733 | 5/1993 | Yamaguchi et al. | 369/59 |
| 5,229,986 | 7/1993 | Mizokami et al. | 369/59 |
| 5,239,531 | 8/1993 | Abe | 369/109 |

*Primary Examiner*—Aristotelis Psitos
*Assistant Examiner*—W. Chris Kim
*Attorney, Agent, or Firm*—Cooper & Dunham

[57] ABSTRACT

The present invention relates to a method of recording and reproducing data on a recording medium, wherein original data is recorded on a recording medium by converting it into a code having more than one "0" between bits "1" such as MFM code and RLL (1,7) code, and a timing of a zero-cross of a reproductive signal or a second order differential signal from the recording medium is detected to obtain a bit "1" and reproduce the original data. The method allows to avoid affect of interference between marks and to record and reproduce data at high recording density and with high reliability.

10 Claims, 1 Drawing Sheet

METHOD FOR RECORDING AND REPRODUCING DATA ON RECORDING MEDIUMS

BACKGROUND OF THE INVENTION

1. Field of the Invention

The present invention relates to a method of recording/reproducing data on a recording medium.

2. Description of the Related Art

A method has been conventionally known, in which original data is converted into a code such that more than one "0" is interposed between bits "1" such as MFM code and RLL code (1,7), the converted code is recorded in a recording medium, a timing of a zero-cross of a reproductive signal or a second order differential signal is detected on the recording medium to obtain a bit "1", and the data is reproduced. In this data reproducing method, as shown (a) in FIG. 1, the original data is converted into the code in such a manner that more than one "0" is interposed between bits "1" a mark "1" is recorded by switching presence and absence thereof, timing with a bit "1" as shown in (b) and (c) of FIG. 1, and a timing at which a reproductive signal shown in (d) of FIG. 1 or a second order differential signal shown in (f) of FIG. 1 crosses a predetermined threshold value or a zero level is detected to obtain the bit "1" so as to reproduce the original data.

However, in the conventional recording/reproducing method, when a short mark such as "01010" is reproduced, the timing of the bit "1" indicated by O mark in (d) and (f) of FIG. 1 is offset before or after from an original position. So, the conventional method is defective in that many errors are liable to be caused in such a portion, and therefore fail to improve a recording density. That is, in case of the reproductive signal, the position of the bit "1" is offset in a direction where there are more bits "0". In case of the second order differential signal, the bit "1" is offset in a direction where there are less bits "0" (i.e. one bit "0"). An interference between marks as it is called thus arises. The interference between marks becomes more and more noticeable as the recording density is higher and the mark is shorter. As a result, when the higher recording density is aimed for, errors are liable to be caused in the reproduced data.

SUMMARY OF THE INVENTION

It is therefore an object of the present invention to provide a method which allows to resolve the above mentioned conventional defectiveness and avoid an effect of the interference between the marks, and therefore record and reproduce data at a high recording density and with high reliability.

The object of the invention can be achieved by a data recording/reproducing method comprising the steps of converting an original data into a code in such a manner that more than one "0" is inserted continuously between a bit "1" and a bit "1" in a time series signal made by combination of binary bits "0" and "1"; recording a mark string on a recording medium by inverting alternatively presence and absence of a recording mark, timing with an appearance of the bit "1" in a converted code to thereby record the data; scanning a recorded mark string with a mark detecting means to obtain a reproductive signal corresponding to the mark string; detecting a timing of an invention of the presence or the absence of the recorded mark in the obtained reproductive signal to obtain a converted code; and obtaining the original data from the converted code to reproduce the data, wherein a central "0" in the pattern "01010" is determined with priority, and the pattern of four bits after and before the central "0" is determined on the basis of the detection of the central "0".

According to the present invention, a position of the central "0" in the pattern "01010" is taken as a time where the differential value of the reproductive signal crosses a zero level, and the presence of the pattern "01010" is detected by using the fact that an amplitude of the reproductive signal is small.

According to the present invention, as a recording medium, an optical data recording medium is used in which the data is recorded and reproduced by scanning with a laser beam spot, and as a recording means or a mark detecting means, the laser beam spot is used.

According to the present invention, the laser beam spot having a half diameter larger than distance between the bits "1" of the pattern of "01010" is used.

According to the present invention, as an optical recording medium, a disc like medium in which data has been recorded or can be recorded at almost the same track recording density on inner and outer tracks is used.

Following advantages are effected by the present inventions.

(1) According to the first invention, since a binary signal in which the positional offset of the bit is minor is used to reproduce the data when detecting the presence or the absence of the bit "1", reproducing errors are reduced, and a recording density is increased by 1.5 times.

(2) According to the second to the fourth inventions, the first invention is more efficiently applied.

(3) According to the fifth invention, data can be recorded and reproduced at the same high track recording density on inner and outer peripheries of a disc, therefore a memory capacity on the disc is increased (by 1.3 to 1.5 times that by CAV method).

Further objects and advantages of the present invention will be apparent from the following description of the preferred embodiments (embodiment) of the invention as illustrated in the accompanying drawings.

DESCRIPTION OF THE PREFERRED EMBODIMENTS

Figure 1:
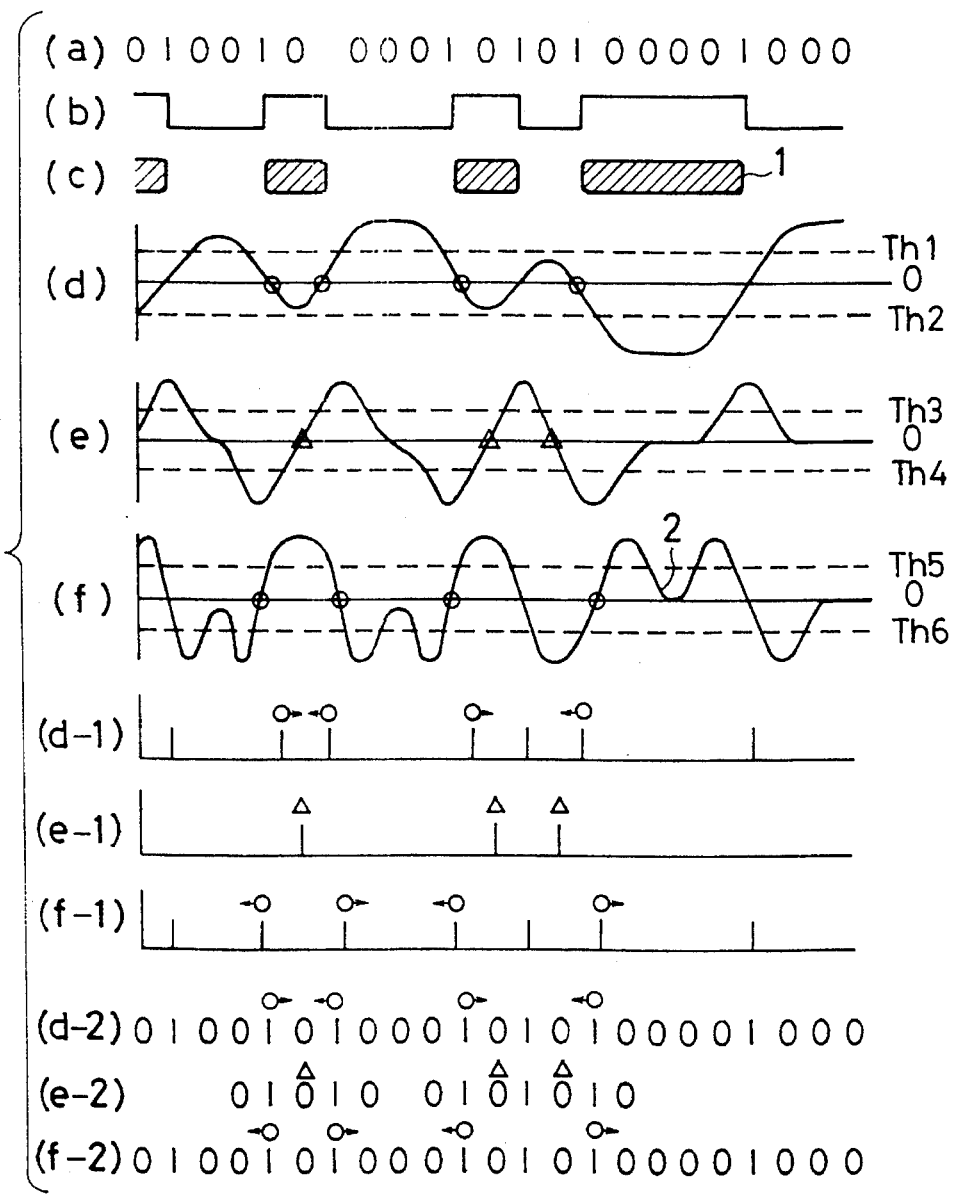
FIG. 1 is an explanatory view of a method of the present invention.

The present invention will be described hereinafter.

The method of the present invention comprises the steps of converting an original data into a code in such a manner that more than one "0" is inserted continuously between a bit "1" and a bit "1" in a time series signal made by combination of binary bits "0" and "1"; recording a mark string on a recording medium by inverting alternatively presence and absence of a recording mark, timing with an appearance of the bit "1" in a converted code to thereby record the data; scanning a recorded mark string with a mark detecting means to obtain a reproductive signal corresponding to the mark string; detecting a timing of an invention of the presence or the absence of the recorded mark in the obtained reproductive signal to obtain a converted code; and, obtaining the original data from the converted code to reproduce the data. Among the marks recorded by the above-mentioned method, there is not only short marks but also long marks. In the present invention, when a long mark is reproduced, an edge of the mark is detected by a conventional method since a positional offset of the edge thereof is minor. However, the short mark is reproduced by a following method.

When a shortest mark corresponding to "01010" shown in (a) of FIG. 1 (which will be a space instead of a mark at a probability of ½) is reproduced, a zero-cross point of a first order differential signal (indicated by Δ) shown in (e) of FIG. 1 is reproduced as a central "0" in "01010".

When detecting "1" in "01010", if a reproductive signal as shown in (d) of FIG. 1 is used as it is, and a point at which the signal crosses a threshold value (zero level in (d)) indicated by O is detected to reproduce "1", the reproduced bit "1" is offset in a direction indicated by an arrow as shown in (d-1) of FIG. 1, and errors are therefore liable to be caused.

If the second order differential signal as shown in (f) of FIG. 1 is used, and a zero-cross point (indicated by O in (f)) is detected, the reproduced bit "1" indicated by O is offset in a contrary direction to the case of (d-1) as shown in (f-1) of FIG. 1, and errors are therefore liable to be caused.

In the present invention, the central "0" in "01010" is reproduced by using the zero-cross point indicated by Δ of the first order differential signal shown in (e) of FIG. 1.

The offset of the zero-cross point of the first order differential signal is minor due to a symmetric property of a pattern "01010". When the central "0" in "01010" has been detected, the bits "1" on both sides of the central "0" are determined automatically. Then, the bits "0" on both sides of the bits "1" is automatically determined. Thus, if the central "0" of the data of five bits of "01010" has been determined, then the data of five bits are automatically determined.

A binary data obtained from (e-1) of FIG. 1 is reproduced data of "01010" as shown in (e-2) of FIG. 1. When the data corresponding to "01010" among data in (d-2) and (f-2) of FIG. 1 reproduced by the conventional method is exclusively and preferentially substituted by the reproduced data "01010" in (e-2) of FIG. 1, combination of data in which a positional offset of the bit is minor is obtained. As a result, reliability of the reproduced data is increased by from ten times to 1000 times.

As a recording medium to which the present invention is applied, there are exemplified a magnetic recording medium, and an optical data recording medium like an optical disc which records and reproduces the data by scanning with a laser beam spot.

In case of the magnetic recording medium, a reproductive signal does not contain a direct current component, and the reproductive signal has a wavelike form as shown in (e) of FIG. 1. Therefore, the present invention is applicable to the magnetic recording medium by using the wave (e) of FIG. 1 and the wave (f) of FIG. 1 obtained by differentiating the wave (e).

In case of the optical recording medium, the reproductive signal contains the direct current component and a wavelike signal is reproduced as shown in (d) of FIG. 1. The present invention is therefore more efficiently applicable to the optical recording medium.

In the first order differential signal (e), the zero-cross points appear also in the positions other than those indicated by Δ marks. So, the reproductive signals shown in (e) of FIG. 1 are used. Presence of the reproductive signal between the threshold values Th1 and Th2 is detected by a window comparator or the like. Only when the first order differential signal (e) crosses the zero level in the presence of the reproductive signal (d) between Th1 and Th2, the zero-cross point is determined to be valid. Thus, only the zero-cross points corresponding to the central "0" of "01010" in the signal (d) can be exclusively selected, and the errors can be more reduced.

As a method of detecting exclusively the zero-cross points indicated by Δ of a first order differential signal (e), there is a following method. The second order differential signal (f) is used in this method. There exists a second order differential signal outside the range between the threshold values Th5 and Th6. Only when the differential signal (e) crosses the zero level in the presence of the above second order differential signal outside the range between the threshold values Th5 and Th6, the zero-cross point is determined to be valid.

Further, as shown in (f) of FIG. 1, the second order differential signal generates a droop which crosses also the zero level so the errors are liable to be caused. Therefore, in order to prevent the errors of zero-cross point caused by the droop, the first order differential signal (e) of FIG. 1 is provided with threshold values Th3 and Th4. Only when the second order differential signal (f) crosses the zero level in the presence of the first order differential signal (e) outside the range between the two threshold values, the zero-cross is determined.

When the presence or the absence of the bit "1" is detected according to the present invention, the error which has been conventionally caused due to the positional offset of the bit "1" in the pattern "101", is not caused. As a result, a limit of the recording density is determined by the positional offset of the bit "1" in the pattern "1001". That is, the data of three bits are packed in a conventional length of two bits. Thus, the recording density can be increased substantially by 3/2 times.

When the method of the present invention is applied to the optical medium on which the data is recorded and reproduced with a laser beam spot, it becomes easy to "take the position of the central "0" in the pattern "01010" as a time where a differential value of a reproductive data signal crosses a 0 value, and to detect the presence of "01010" by taking advantage of the fact that an amplitude of the reproductive data signal of "01010" is small" as described in the second invention.

In this case, if a laser beam spot having a half diameter larger than the distance between the bits "1" in the pattern "01010" is used, the method according to claim 2 is preferably applied to the second invention.

Further, if the present invention is applied to an optical disc medium of CLV or ZCAV method where a track recording density on inner and outer peripheral tracks of the optical disk medium is the same, the method according to the second invention is easily applied on all surface of the inner and outer peripheries of the disc.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data recording/reproducing method comprising the steps of:

converting an original data into a code in such a manner that more than one "0" is inserted continuously between a bit "1" and a bit "1" in a time series signal made by combination of binary bits "0" and "1";

recording a mark string on a recording medium by inverting alternatively presence and absence of a recording mark, timing with an appearance of the bit "1" in a converted code to thereby record the data;

scanning a recording mark string with a mark detecting means to obtain a reproductive signal corresponding to the mark string;

detecting a timing of an inversion of the presence or the absence of the recorded mark in the obtained reproductive signal to obtain a converted code by comparing the amplitude of the reproductive signal with a first predetermined value and differentiating the reproductive signal to obtain a first order differential value; and obtaining the original data from the converted code to reproduce the original data, wherein when the converted code includes a pattern "01010", the presence of the pattern "01010" is detected by using the fact that an amplitude of the reproductive signal of the pattern "01010" is smaller than a first predetermined value, and a time where the first order differential value of the reproductive signal crosses a zero level is used as a position of the central "0" in the pattern "01010".

2. A data recording/reproducing method according to claim 1, wherein as a recording medium, an optical data recording medium is used in which the data is recorded and reproduced by scanning with a laser beam spot, and as a recording means or a mark detecting means, the laser beam spot is used.

3. A data recording/reproducing method according to claim 2, wherein the laser beam spot having a half diameter larger than a distance between the bits "1" of the pattern of "01010" is used.

4. A data recording/reproducing method according to claim 3, wherein as an optical medium, a disk like medium which is capable to record data at the same track recording density on inner and outer tracks is used.

5. A data recording/reproducing method according to claim 2, wherein as an optical medium, a disk like medium which is capable to record data at the same track recording density on inner and outer tracks is used.

6. A data recording/reproducing method comprising the steps of:

converting an original data into a code in such a manner that more than one "0" is inserted continuously between a bit "1" and a bit "1" in a time series signal made by combination of binary bits "0" and "1";

recording a mark string on a recording medium by inverting alternatively presence and absence of a recording mark, timing with an appearance of the bit "1" in a converted code to thereby record the data;

scanning a recording mark string with a mark detecting means to obtain a reproductive signal corresponding to the mark string;

detecting a timing of an inversion of the presence or the absence of the recorded mark in the obtained reproductive signal to obtain a converted code by differentiating the reproductive signal to obtain a first and second order differential value and comparing the amplitude of the second order differential value with a predetermined value; and obtaining the original data from the converted code to reproduce the original data, wherein the time where the first order differential value of the reproductive signal crosses a zero level is used as a position of the central "0" in the pattern "01010" only when an amplitude of the second order differential value of the reproductive signal of the pattern "01010" is greater than the predetermined value.

7. A data recording/reproducing method according to claim 6, wherein as a recording medium, an optical data recording medium is used in which the data is recorded and reproduced by scanning with a laser beam spot, and as a recording means or a mark detecting means, the laser beam spot is used.

8. A data recording/reproducing method according to claim 7, wherein the laser beam spot having a half diameter larger than a distance between the bits "1" of the pattern of "01010" is used.

9. A data recording/reproducing method according to claim 8, wherein as an optical medium, a disk like medium which is capable to record data at the same track recording density on inner and outer tracks is used.

10. A data recording/reproducing method according to claim 7, wherein as an optical medium, a disk like medium which is capable to record data at the same track recording density on inner and outer tracks is used.

* * * * *